United States Patent [19]

Mertz et al.

[11] Patent Number: 5,132,865
[45] Date of Patent: Jul. 21, 1992

[54] ULTRA HIGH-SPEED CIRCUIT BREAKER WITH GALVANIC ISOLATION

[75] Inventors: Jean-Luc Mertz; Pierre Perichon, both of Grenoble; Robert Morel, Eybens; Gérard Pion-Roux, Meylan, all of France

[73] Assignee: Merlin Gerin, Meylan, France

[21] Appl. No.: 579,583

[22] Filed: Sep. 10, 1990

[30] Foreign Application Priority Data

Sep. 13, 1989 [FR] France .................. 89 12294

[51] Int. Cl.⁵ .............................................. H02H 3/00
[52] U.S. Cl. ........................................ 361/6; 361/102; 361/114; 361/101
[58] Field of Search ................ 361/3, 6, 58, 100, 101, 361/102, 114, 115, 152; 307/141

[56] References Cited

U.S. PATENT DOCUMENTS

| | | | |
|---|---|---|---|
| Re. 33,314 | 8/1990 | Cowles | 361/3 |
| 3,058,034 | 10/1962 | Sandin | 361/102 |
| 3,058,036 | 10/1962 | Renther et al. | 361/102 |
| 3,611,043 | 10/1971 | Steen | 361/102 |
| 3,614,464 | 10/1971 | Chumakov | 361/102 |
| 4,853,822 | 8/1989 | Kamijo | 361/100 |
| 4,956,738 | 9/1990 | Defosse et al. | 361/3 |

FOREIGN PATENT DOCUMENTS

| | | |
|---|---|---|
| 0104981 | 4/1984 | European Pat. Off. . |
| 1106396 | 12/1961 | Fed. Rep. of Germany . |
| 3643473 | 6/1988 | Fed. Rep. of Germany . |
| 1147477 | 11/1957 | France . |
| 1530421 | 6/1968 | France . |
| 2207308 | 1/1989 | United Kingdom . |

Primary Examiner—Steven Stephan
Assistant Examiner—Ben Davidson
Attorney, Agent, or Firm—Parkhurst, Wendel & Rossi

[57] ABSTRACT

A circuit breaker comprises a static switch electrically connected in series with a disconnecting switch having an operating mechanism with a handle to close and open a system of main contacts. A voltage sensor ocmprises an electromagnet with a moving core capable of occupying an active locking position and an inactive unlocking position of the mechanism, respectively in the on state and in the off state of the switch. Opening of the disconnecting switch is inhibited if voltage is present on the output terminals.

7 Claims, 2 Drawing Sheets

ULTRA HIGH-SPEED CIRCUIT BREAKER WITH GALVANIC ISOLATION

BACKGROUND OF THE INVENTION

The invention relates to a circuit breaker housed in a case equipped with input terminals and output terminals, and housing a static switch electrically connected in series with an electromechanical switchgear device having a control mechanism with a handle to close or open a system of main contacts, the switch being associated with a control circuit designed to switch said switch from the on state to the off state and vice-versa.

According to the document FR-A 2,533,363, the electromechanical switchgear device is constituted by a circuit breaker having a magnetic and thermal trip device connected in series in the main circuit with the main contacts and the static switch. The role of the latter consists in making and breaking the rated current of the pole-unit, whereas the circuit breaker performs both the disconnection function and the overload and short-circuit protection function. Opening of the circuit breaker contacts when fault currents occur is dependent upon the operation of the trip device and the response of the mechanism. This results in a rather long total tripping time which is incompatible for protection of electronic component circuits.

The object of the invention is to improve the response time of a static circuit breaker with galvanic isolation.

SUMMARY OF THE INVENTION

The circuit breaker according to the invention is characterized in that the electromechanical switchgear device is formed by a disconnecting switch, and that locking means cooperate with the mechanism to prevent the main contacts of the disconnecting switch from opening when the static switch is in the on state.

Preventing the disconnecting switch from opening results from electromechanical locking controlled by a voltage sensor located load-side of the static switch.

The voltage sensor comprises an electromagnet having a moving core or tongue, capable of occupying an active locking position and an inactive unlocking position of the mechanism, respectively in the on state and in the off state of the switch.

Opening of the disconnecting switch can then take place without an arc, ensuring galvanic isolation between the input and output terminals, enabling work to be carried out on the load in full safety.

The disconnecting switch mechanism actuates an auxiliary contact, associated with the control circuit of the switch, and arranged in such a way that opening of the auxiliary contact takes place before that of the main contacts, and closing of the auxiliary contact takes place after that of the main contacts.

The static switch is formed by a power transistor or set of power transistors depending on whether the power source is of the direct or alternating current type.

The overload and short-circuit protection function is performed by an auxiliary fuse in the event of a static switch failure.

In the case of normal circuit breaker operation, breaking of the rated current, and of a fault current, notably an overload or short-circuit, is performed solely by the static switch. The breaking times are very fast, in the order of 20 microseconds.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
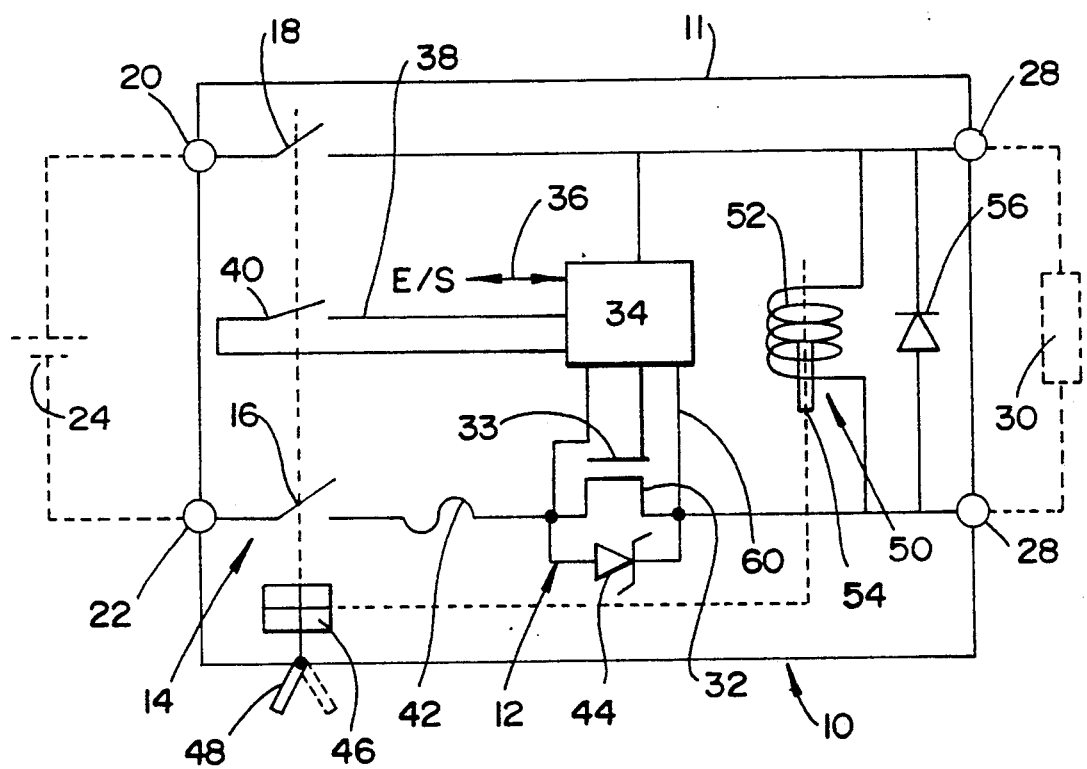
FIG. 1 represents the wiring diagram of the circuit breaker in the open state for a direct current power source.

Referring now an ultra high-speed circuit breaker 10 is housed in a-case 11 containing a static switch 12 electrically connected in series with a disconnecting switch 14 with separable main contacts 16, 18. The case 11 comprises a pair of input terminals 20, 22 for connection of a direct current power source 24, and a pair of output terminals 26, 28 to supply the load 30.

The static switch 12 is formed by an IGBT type power transistor 32, whose trigger 33 is controlled by a control circuit 34 cooperating via a bus 36 with input-output boards E/S, and via a connecting circuit 38 with an auxiliary contact 40 of the disconnecting switch 14. A fuse 42 is inserted between the main contact 16 of the disconnecting switch 14 and the transistor 32. A protective diode 44 of the TRANSIL type is reverse connected to the terminals of the transistor 32, and enables the over-voltages to be clipped when switching from the off state to the on state and vice-versa.

The mechanism 46 of the disconnecting switch 14 is actuated by a manual operating handle 48 capable of occupying an open position (in bold lines) or a closed position (in dashed lines). Movement of the handle 48 from the closed position to the open position first brings about opening of the auxiliary contact 40 before that of the main contacts 16, 18 of the disconnecting switch 14. Reverse movement of the handle 48 from the open position to the closed position brings about closing of the main contacts 16, 18 before that of the auxiliary contact 40.

A voltage sensor 50 comprises an electromagnet 52 with a plunger core 54 designed to cooperate with the mechanism 46 to lock the disconnecting switch 14 in the closed position, preventing any attempt to open the main contacts 16, 18 manually while there is voltage present load-side of the transistor 32. The coil of the electromagnet 52 is connected in parallel to the output terminals 26, 28. A free-wheel diode 56 is connected in parallel to the coil of the electromagnet 52 and to the load 30. The control circuit 34 is also connected to the transistor 32 via a voltage measuring circuit 60.

Operation of the circuit breaker 10 according to FIG. 1 is as follows:

OPENING—NORMAL OPERATION

The disconnecting switch 14 has a disconnection function to ensure galvanic insulation if an operation is to be carried out on the load 30. Interruption of the rated current and of an overload or short-circuit current is performed by the static switch 12, whose trigger 33 receives a switch-off order from the control circuit 34. The latter is controlled either automatically by the control signals from the input-output boards E/S transmitted via the bus 36 and by the measuring circuit 60 of the voltage at the terminals of the transistor 32, or manually depending on the status of the auxiliary contact 40. The fuse 42 does not play an part in this operating mode.

Should an overload or short-circuit current occur, the impedance of the transistor 32 increases, resulting in a voltage fluctuation detected by the measuring circuit 60. The control circuit 34 delivers a switch-off order as soon as the voltage value exceeds a preset threshold.

Interruption of the current is achieved very quickly in a time in the order of 20 microseconds. The impedance change of the transistor 32 moreover enables a short-circuit current limiting effect to be obtained, before the transistor 32 is effectively switched off. The short-circuit current is rapidly limited to a preset value, for example 150A.

It can be noted that the automatic opening order by the input-output boards E/S and measuring circuit 60 causes the current to be interrupted by switching the transistor 32 off. The voltage at the terminals of the electromagnet 52 is annulled and the moving core 54 is returned to an inactive position, leading to the mechanism 46 being unlocked Opening of the disconnecting switch 14 by means of the handle 48 is then authorized to perform disconnection.

The manual opening order of the control circuit 34 occurs at the beginning of the opening movement of the handle 48. The main contacts 16, 18 remain locked in the closed position, but the auxiliary contact 40 opens during this first opening phase. The control circuit 34 then switches the transistor 32 off according to the process described above. The manual opening order by the auxiliary contact 40 has priority over automatic control by the. bus 36.

In both control cases, interruption of the rated current and of the fault current is performed by the power transistor 32, and the disconnecting switch 14 can only open after the transistor 32 has been switched off. Opening of the two main contacts 16, 18 of the disconnecting switch 14 fully isolates the load 30 from the power source 24.

OPERATION IN THE EVENT OF A STATIC SWITCH FAILURE

In the event of failure of the static switch 12 or faulty operation of the control circuit 34, the breaking function is no longer performed by the transistor 32 which then remains permanently on despite the opening orders from the auxiliary contact 40, bus 36, and measuring circuit 60. The on state of the transistor 32 is detected by the electromagnet 52 of the voltage sensor 50, and the core 54 locks the disconnecting switch 14 in the closed position. Any attempt to open the disconnecting switch 14 by means of the handle 48 is prevented by the electromechanical locking, which remains effective so long as the load 30 remains powered on. The power supply then has to be interrupted by an additional switch (not represented), located line-side of the input terminals 20, 22, and outside the case 11. The fuse 42 then provides protection in the event of an overload or short-circuit.

CLOSING AFTER GALVANIC ISOLATION

The manual closing order by means of the handle 48 with the disconnecting switch 14 in the open state first causes the main contacts 16, 18 to close, which takes place without an arc, due to the fact that the static switch 12 is in the off state. The auxiliary contact 40 then closes in a second phase and switches the transistor 32 on to supply the load 30.

Automatic closing by the input-output boards E/S is impossible when the auxiliary contact 40 is open.

Figure 2:
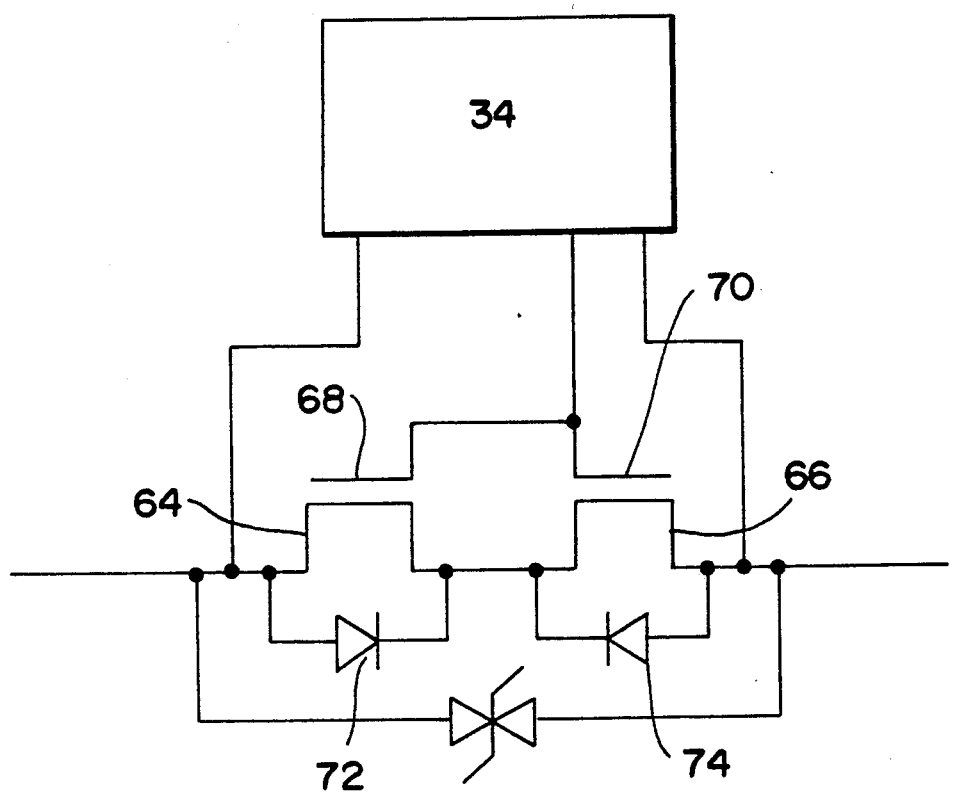
FIG. 2 is an alternative embodiment for an alternating current power source.

The alternative embodiment in FIG. 2 is adapted to an alternating current power source 24. The power transistor 32 in FIG. 1 merely has to be replaced by two IGBT power transistors 64, 66, reverse connected in series, having their bases 68, 70 commonly connected, and controlled by the control circuit 34. Each transistor 64, 66 has a diode 72, 74 associated with it in parallel. The diode 72 of the first transistor 64 lets a positive alternating current half-wave flow which will be cut off by the second transistor 66 if the control circuit 34 sends an opening order. The diode 74 of the second transistor 66 lets a negative current half-wave flow which will be cut off by the first transistor 64.

We claim:

1. A circuit breaker apparatus housed in a case equipped with input terminals for connection to a power supply and output terminals for connection to a load, said circuit breaker apparatus comprising:
   a disconnecting switch including main contacts that connect the input terminals to the output terminals and a manually operable control mechanism for controlling the closing or opening of the main contacts.
   , an electronic switch connected in electrical series with the disconnecting switch between the input terminals and the output terminals,
   a control circuit connected to the electronic switch for switching the electronic switch between an ON state, where current can flow from the input terminals to the output terminals, and an OFF state, where current cannot flow from the input terminals to the output terminals,
   a voltage sensor mechanism for determining when a voltage is present at the output terminals and for preventing the operation of the manually operable control mechanism of the disconnecting switch when a voltage is present at the output terminals, and
   prevention means for preventing the control circuit from switching the electronic switch to the ON state when the main contacts of the disconnecting switch are open and for enabling the control circuit to switch the electronic switch to the ON state when the main contacts are closed.

2. The circuit breaker apparatus according to claim 1, wherein the voltage sensor mechanism comprises an electromagnet having a moving core that moves to an active locking position when a voltage is present at the output terminals to prevent the operation of the manually operable control mechanism and moves to an inactive unlocking position when a voltage is not present at the output terminals to permit the operation of the manually operable control mechanism.

3. The circuit breaker apparatus according to claim 1, wherein the prevention means includes an auxiliary contact and the control mechanism of the disconnecting switch actuates the auxiliary contact so that opening of the auxiliary contact takes place before that of the main contacts and the closing of the auxiliary contact takes place after that of the main contacts.

4. The circuit breaker apparatus according to claim 3, wherein the control circuit is connected by a bus to input-output boards for automatic control of the electronic switch, the control circuit is response to the state of the auxiliary contact to control the operation of the electronic switch, and the control circuit gives priority to the state of the auxiliary contact over the automatic control by the bus in controlling the operation of the electronic switch.

5. The circuit breaker apparatus according to claim 1, wherein the electronic switch comprises at least one power transistor.

6. The circuit breaker apparatus according to claim 5, further comprising a fuse connected in series with the disconnecting switch inside the case to provide a protection function if the electronic switch fails.

7. The circuit breaker according to claim 2, wherein a free-wheel diode is connected to the output terminals, in parallel with the operating coil of the electromagnet.

* * * * *